United States Patent [19]

Thorman et al.

[11] Patent Number: 5,678,396
[45] Date of Patent: Oct. 21, 1997

[54] SECTIONED GROOVED ROLLER SCRAPER

[75] Inventors: Christopher Scott Thorman; Phillip Orland Swenson, both of Beaver Dam; Ronald Lee Reichen, Horicon, all of Wis.

[73] Assignee: Deere & Company, Moline, Ill.

[21] Appl. No.: 518,383

[22] Filed: Aug. 23, 1995

[51] Int. Cl.⁶ .................................................. A01D 34/62
[52] U.S. Cl. ................................ 56/7; 56/249; 56/294
[58] Field of Search ............................. 56/7, 249, 294, 56/DIG. 20, 252, 253

[56] References Cited

U.S. PATENT DOCUMENTS

| 3,759,022 | 9/1973 | Snyder et al. | 56/294 X |
| 5,291,724 | 3/1994 | Cotton | 56/7 X |
| 5,394,681 | 3/1995 | Nolan et al. | 56/249 |

OTHER PUBLICATIONS

Brochure entitled "Jacobsen Turf Groomer™ Greens Conditioner Professional Turf Equipment", published by Jacobsen in 1989 in the U.S.A., 3 pages.

Parts catalog for "3215 and 3235 Lightweight Fairway Mowers", published by Deere & Company in 1985 in the U.S., pp. 85–5, 85–6, 85–7.

Jacobsen Testron, Jacobsen Division of Textron Inc., brochure entitled "Jacobsen—The Royal Family of Greens King IV Triplex Greensmowers", dated 1989, 2 pages, published in the U.S.A.

Primary Examiner—Terry Lee Melius

[57] ABSTRACT

A grooved roller scraper having a rod mounted to the reel mower cutting unit frame, and an elongate plate member coupled with the rod member. A plurality of scraper sections having slotted openings are bolted to the elongate plate member for allowing the scraper sections to be adjusted laterally. The scraper sections include protruding portions which extend into the spaces defined between adjacent washers for clearing debris from the grooved roller.

15 Claims, 4 Drawing Sheets

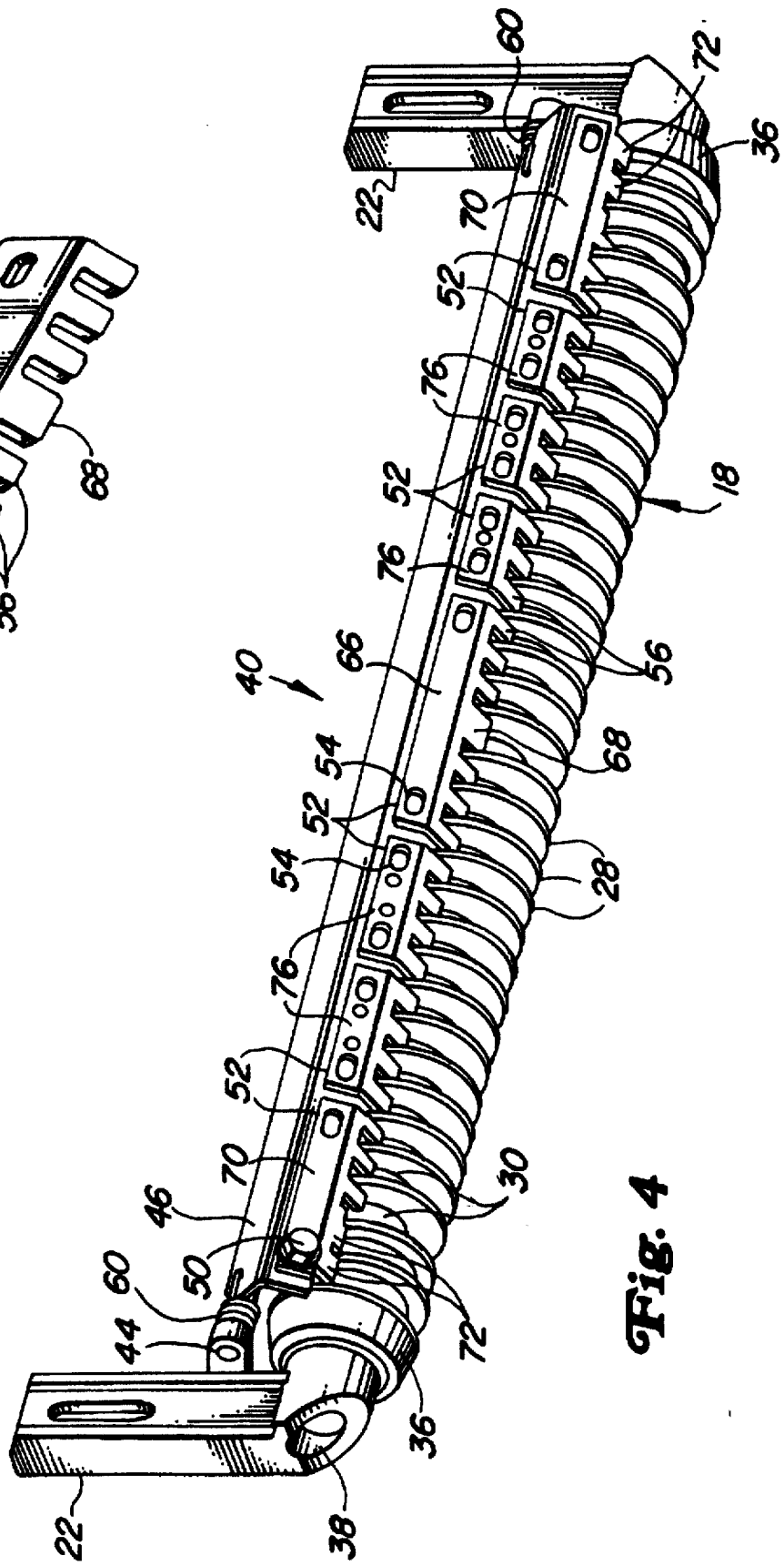

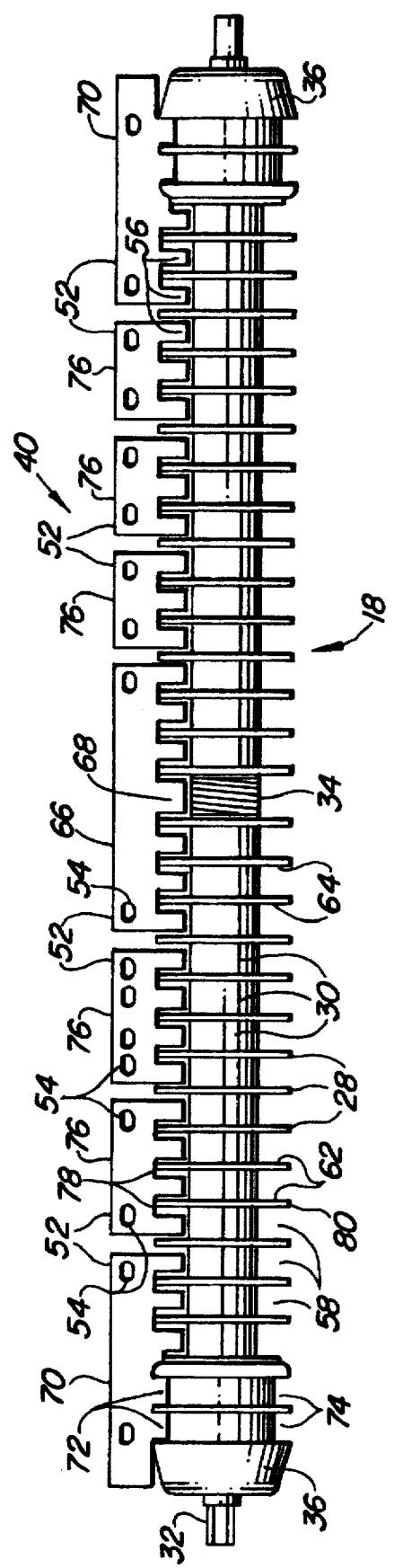

SECTIONED GROOVED ROLLER SCRAPER

1. FIELD OF THE INVENTION

This invention relates to scraper mechanisms that wipe or clear debris from ground engaging rollers of reel mower cutting units.

2. BACKGROUND OF THE INVENTION

Reel mower cutting units are commonly used to mow grass in areas requiring very acurate mowing of turf, such as on golf courses. Conventional reel mower cutting units include ground engaging rollers which roll in contact with the ground surface for supporting the cutting unit above the ground. A cylindrical cutting reel which interacts with a bedknife for cutting grass with a shearing action is positioned between the front and rear rollers. As the rollers contact the ground during forward travel, debris such as grass clippings, sand and dirt tends to accumulate on the rollers. This can increase the effective diameter of the roller and negatively affect the cut quality of the reel mower.

A first type of ground engaging roller is a cylindrically shaped roller having a smooth outer surface. Grass clippings and debris can quickly accumulate on the smooth outer surface of smooth rollers as they roll in contact with the ground. It is known to provide these conventional smooth rollers with roller scrapers which include a straight or flat bar which is biased by a spring against the smooth outer surface of the roller for scraping debris from the roller. This type of straight roller scraper is typically a continuous length of metal material which extends the entire width of the roller, and therefore when a portion of the scraper bar is damaged during operation the entire bar must be replaced. These flat roller scrapers are generally not adapted for scraping debris from rollers having irregular outer surfaces such that of the grooved rollers described below.

A second type of ground engaging roller is a grooved roller which includes a central rod or tube on which spacers and washers are alternately stacked. The washers have larger outer diameters than the spacers, and therefore the outer diameters of the washers engage the surface of the ground during mowing operation. A space or groove is defined between adjacent washers by the spacers' smaller outer diameter. The outer diameters of the washers press against the turf and act to fluff up the turf which is about to be cut by the reel and bedknife. Grooved rollers can therefore be effective in enhancing the quality of cut. During operation, debris such as grass clippings, dirt and soil particles can accumulate in the grooves or spaces between adjacent washers. It is therefore known to provide grooved rollers with a comb-like scraper having teeth that project into the grooves or spaces between the washers for clearing debris and clippings therefrom. This type of comb-like roller scraper is conventionally manfactured from a single piece of metal which, when mounted to the cutting unit, extends across the entire width of the roller. Therefore, when one or more of the teeth of the comb-like structure is damaged or breaks off, the entire scraper must be replaced.

Furthermore, as the reel mower is operated over extended periods of time, the washers and spacers tend to wear and will shift slightly on the central tube of the grooved roller. A spring positioned near the center of the rod will bias the washers and spacers outwardly toward the outer lateral edges of the rod. As the washers and spacers wear, they become thinner and shift laterally outwardly slightly under the biasing force of the spring. The teeth of the comb-like scraper remain stationary, and as the washers and spacers wear they shift laterally with respect to the teeth of the comb-like scraper. The misalignment of the teeth with respect to the washers can prevent the teeth of the comb-like scraper from properly clearing debris from the roller.

Ground rollers are conventionally assembled from washers and spacers having loose tolerances. These washers and spacers may have dimensions which vary slightly due to loose tolerances, which causes the positioning of the washers and spacers on the central tube to vary slightly from roller to roller. Conventional comb-like roller scrapers have teeth with fixed positions which are often misaligned with the washers after assembly due to the loose tolerance parts.

It would therefore be desirable to provide a roller scraper mechanism which is adapted for clearing debris from a grooved roller, and which is adapted for scraping debris from the roller even after the washers and spacers have shifted position due to wear after long periods of operation. It would be desirable for such a scraper mechanism to be assembled onto a grooved roller having low tolerance parts whose position varies slightly from roller to roller. It would also be desirable for such a roller scraper to eliminate the need for the entire roller scraper mechanism to be replaced if a portion of the roller scraper is damaged during operation.

SUMMARY OF THE INVENTION

The preferred embodiment of the present invention provides a scraper mechanism adapted for use with grooved rollers of the type having washers and spacers alternately stacked on a central tube. The scraper mechanism includes a rod member and elongate plate member which extend the entire lateral width of the grooved roller. Coupled to the elongate plate member are a plurality of scraper sections, each having a plurality of protruding portions which extend between adjacent washers for scraping or wiping debris from the roller. The scraper sections include slot-like openings through which bolts are positioned for mounting the scraper sections to the elongate plate member. These slots allow the scraper sections to be adjusted or shifted laterally to accommodate the shifting of the washers and spacers due to wear. The scraper sections are biased toward and against the grooved roller by a pair of torsion springs. An edge portion of the scraper sections abuts the radially outer edge of the washers during operation for scraping debris therefrom. When a particular scraper section becomes damaged during operation, that particular roller scraper section can be replaced without requiring the entire scraper mechanism to be replaced. Maintenance and repair of the scraper mechanism according to the present invention is therefore made relatively simple and easy. The scraper sections are adapted for use with a variety of different length rollers since they can be provided with a a different combination or number of scraper sections according to the present invention. The slots of the scraper sections also allow the mechanism to be assembled to a roller scraper having loose tolerance washers and spacers which may cause the different rollers to have washers positioned at slightly different locations.

BRIEF DESCRIPTION OF THE DRAWINGS

FIG. 4 is a perspective view of the front brackets, front grooved roller and sectioned roller scraper of the cutting unit shown in FIG. 1 according to the present invention.

FIG. 5 is a perspective view of the central scraper section according to the present invention.

FIG. 6 is a partial view of the front grooved roller and scraper sections according to the preferred embodiment.

DESCRIPTION OF THE PREFERRED EMBODIMENT

Figure 1:
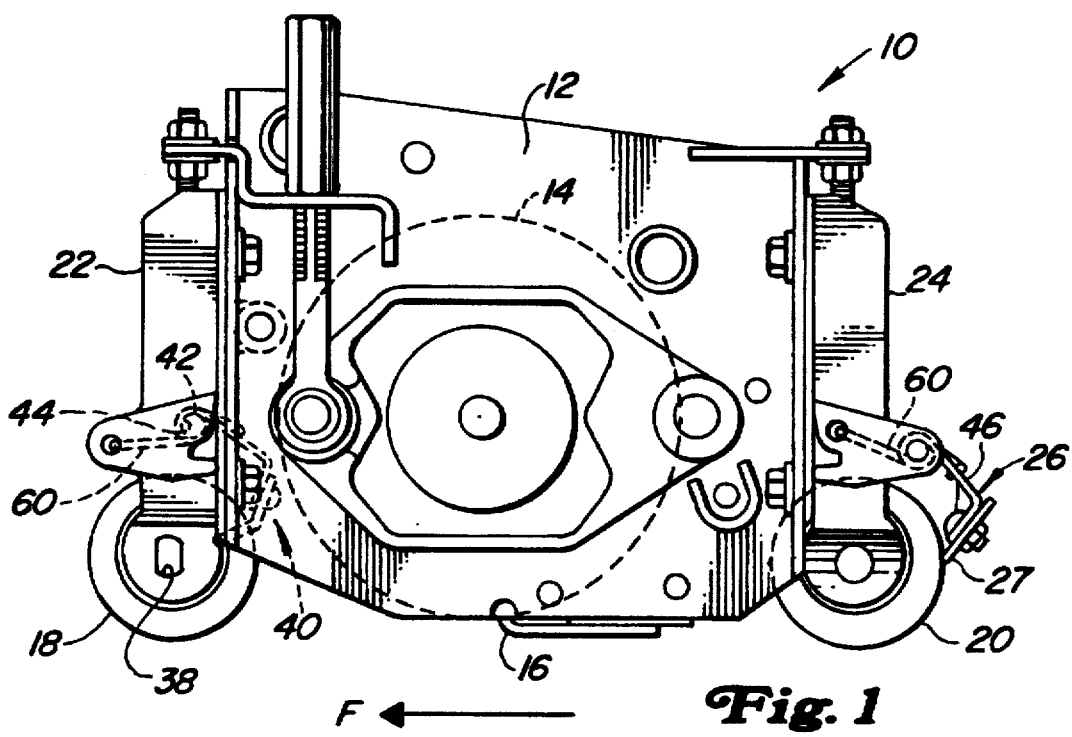
FIG. 1 is a side view of a reel mower cutting unit having the sectioned roller scraper according to the preferred embodiment of the present invention.
Figure 2:
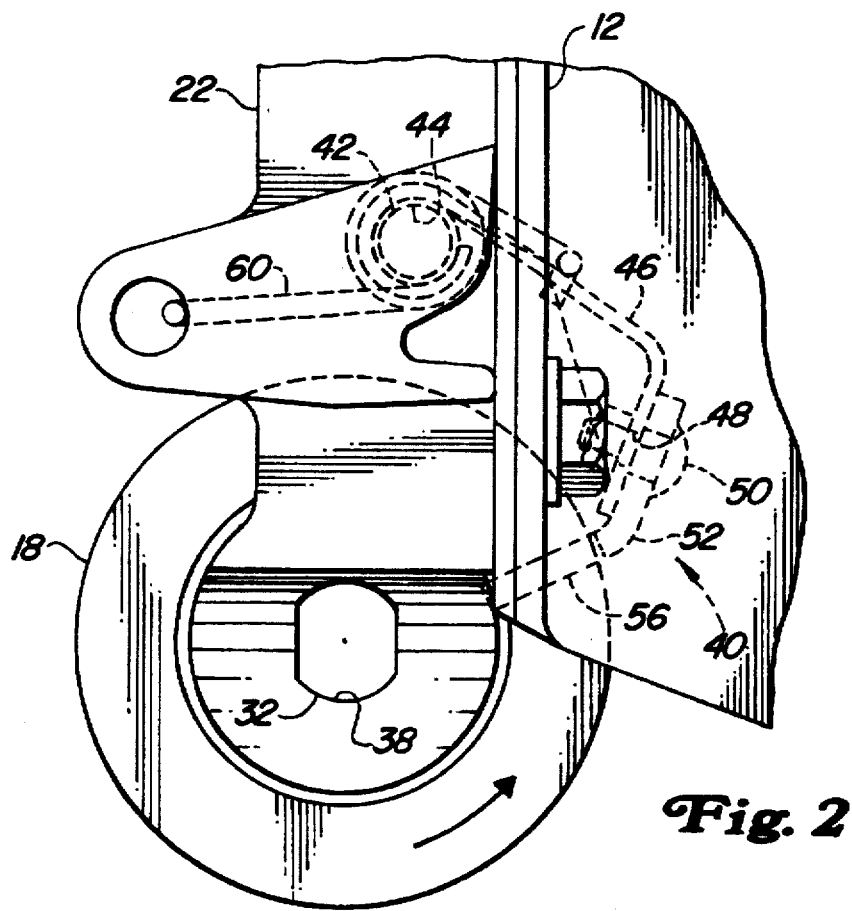
FIG. 2 is a side view of the front grooved roller and sectioned roller scraper according to the present invention.
Figure 3:
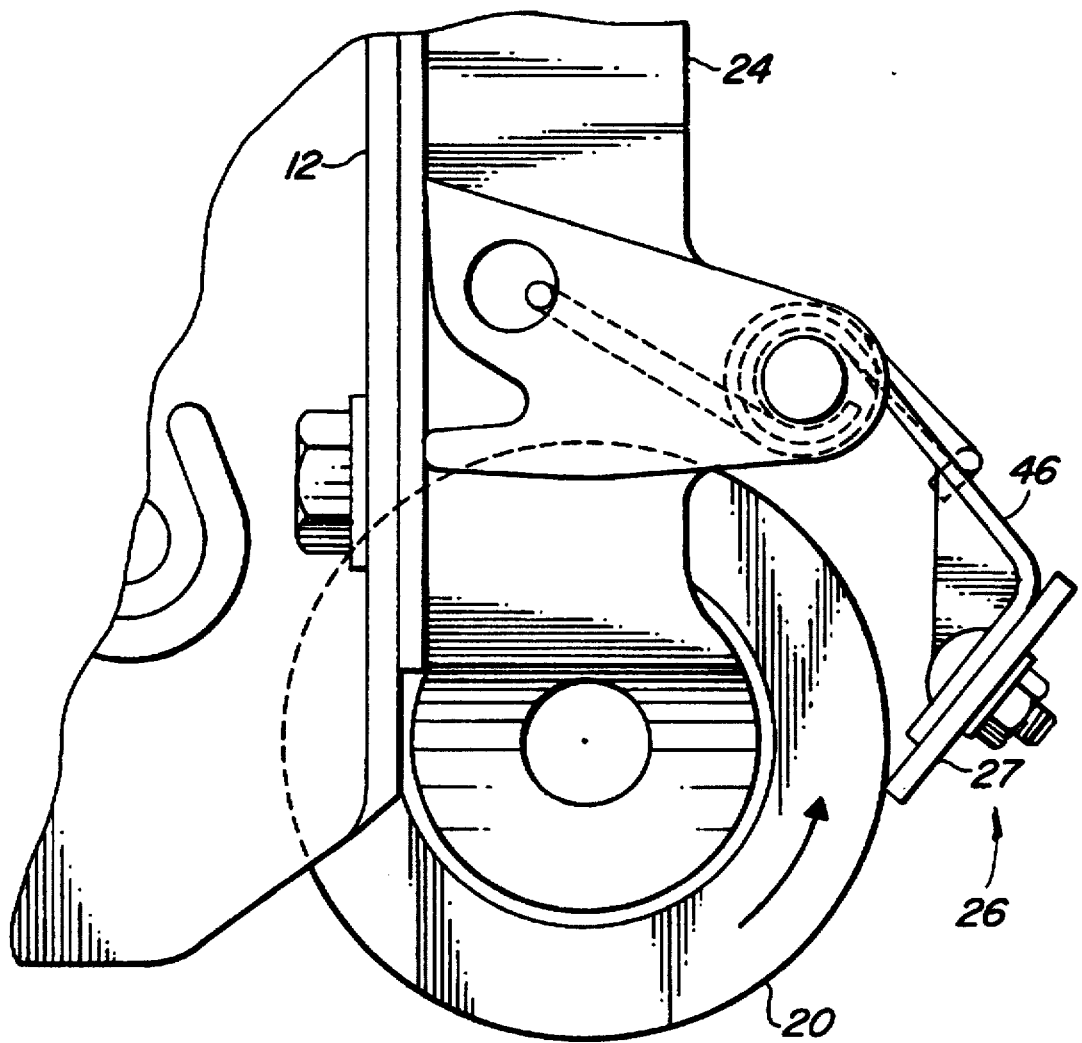
FIG. 3 is a side view of the rear smooth roller and roller scraper of the cutting unit shown in FIG. 1.

Referring now to FIG. 1, there is shown a conventional reel mower cutting unit 10 which includes the preferred embodiment of the present invention. The reel mower cutting unit 10 includes a frame 12 which supports a cylindrical cutting reel 14 and a bedknife 16 which interact to cut grass with a shearing action. Front and rear rollers 18 and 20 are coupled with respective brackets 22 and 24 and roll in contact with the ground for supporting the frame 12 of the cutting unit 10 during mowing operation. The rear roller 20, as best seen in FIG. 3, is a smooth surfaced roller having a cylindrical shape which acts to smooth and level the ground surface after the front roller 18 and cutting reel 14 pass over a section of turf. The rear roller 20 includes a straight edged roller scraper 26 for wiping debris from the outer surface of the roller 20. The rear roller scraper 26 includes a wear plate 27 bolted to an elongate plate member 46. The wear plate 27 engages the smooth surfaced rear roller 20 for scraping debris therefrom. The front roller 18, as best seen in FIGS. 2, 4 and 6, is a grooved roller having washers 28 and spacers 30 stacked on a central rod or tube 32 with a spring 34 positioned near the middle of the rod 32 for biasing the washers 28 and spacers 30 outwardly towards the end portions of the rod 32. The front roller 18 includes end cap members 36, as best seen in FIGS. 4 and 6, at the outer end portions of the rod 32. The rod 32 is supported within an opening 38 defined in the front bracket 33. When an operator wishes to adjust the height at which grass is cut, the brackets 22 and 24 are shifted vertically to change or alter the vertical position of the brackets 22 and 24 and rollers 18 and 20 with respect to the cutting unit frame 12. When adjusted to a new position the rollers 18 and 20 will support the cutting unit at a different height above the ground which establishes a different cutting height.

Referring now to FIGS. 2, 4 and 6, there is shown in greater detail the grooved roller scraper 40 according to the present invention. The grooved roller scraper 40 according to the present invention includes a rod 42 which is supported within an opening 44 defined in the front brackets 22. A laterally extending member or elongate plate member 46 is pivotally mounted to the rod 42. The elongate plate member 46 generally extends the entire width of the cutting unit 10 and front roller member 18. The elongate plate member 46 also includes openings 48 through which attaching means or bolts 50 are received for securing scraper sections 52 to said elongate plate member 46. The scraper sections 52 include slot-like openings 54 through which the bolts 50 pass. The scraper sections 52 also include protruding portions 56 which, during operation, are positioned within the spaces 58 between the washers 28 of the grooved front roller 18. These protruding portions 56 clear debris from the space 58 between adjacent washers 28 of the grooved roller 18. The present invention also includes torsion springs 60 which are engaged between the elongate plate member 46 and the front brackets 22 for operatively biasing the elongate plate 46 and scraper sections 52 toward and into engagement with the grooved front roller 18.

To lower manufacturing costs, conventional grooved rollers 18 of the type shown in FIGS. 4 and 6 are typically assembled from relatively loose tolerance washers 28 and spacers 30 which may have slightly different dimensions. Therefore, the exact location of each washer 28 and spacer 30 may vary from roller to roller. The present invention is adapted to accommodate these loose tolerances. Once the grooved roller 18 is coupled with the cutting unit 10, the scraper sections 52 according to the present invention can be coupled with the elongate plate member 46. The slots 54 of the scraper sections 52 allow the scraper sections 52 to be adjusted by an assembler to be positioned in the particular location required by the particular positions of the washers 28 and spacers 30. The present invention therefore allows the scraper sections 52 to be properly aligned with loose tolerance washers 28 and spacers 30.

After long periods of operation, the spacers 28 and washers 30 rub together as the washers 30 rotate in contact with the ground during travel and may tend to wear and become thinner as they rub together. The spring 34 at the center of the grooved roller 18 presses the washers 28 and spacers 30 outwardly as they become thinner, and therefore the washers 28 and spacers 30 tend to shift outwardly after extended periods of use and wear. As seen in FIG. 6, the washers 28 have room to shift laterally within the space 58 between the protruding portions 56 of the scraper sections 52.

To further accommodate shifting of the washers 28 due to wear, the scraper sections 52 can be positioned during assembly such that the protruding portions 56 abut the vertical side portions of the washers 62 which face the central spring 34 so that as the washers 28 and spacers 30 wear and shift laterally outwardly away from the central spring 34 the washers 28 have the maximum amount of clearance between adjacent protruding portions 56 to shift outwardly. The protruding portions 56 of the scraper sections 52 are therefore spaced from each other to allow the washers 28 to shift laterally as the washers 28 and spacers 30 wear without initially requiring any adjustment of the scraper sections 52.

If the washers 28 continue to shift laterally as they wear and get thinner, the washer's vertical side portions 64 which face away from the central spring 34 may eventually abut against the side edges of the protruding portions 56. To accommodate this more extreme lateral shifting of the washers 28, the scraper sections 52 according to the present invention can be shifted laterally with respect to the elongate member 46. The bolts 50 which mount the scraper sections 52 in a fixed position with respect to the elongate plate member 46 can be loosened, and the slotted openings 54 formed in the scraper sections 52 will allow the scraper sections 52 to be shifted laterally to be properly aligned with the new positions of the washers 28. Therefore the scraper sections 52 according to the present invention accommodate a grooved roller 18 having washers 28 and spacers 30 which shift due to wear after extended periods of use. Alternatively, the slots 54 according to the present invention could also be defined in the elongate plate member 46 for allowing the scraper sections 52 to be adjusted laterally to accommodate the shifting washers 28 and spacers 30.

The scraper sections 52 are separate parts coupled with the elongate plate member 46, and therefore if a particular scraper section 52 is damaged, that scraper section 52 can be replaced without requiring the entire scraper assembly 40 to be replaced. Replacement costs incurred after the scraper has been damaged are therefore relatively low.

The scraper sections 52 according to the preferred embodiment, as clearly seen in FIG. 6, are not all identical. The central scraper section 66 has a central protruding portion 68 which is relatively large for occupying the space adjacent the central spring 34. This central scraper section 66 remains positioned adjacent the central spring 34 after washer and spacer wear has occurred.

The outer scraper sections 70 have protruding portions 72 which clear debris from the grooves 74 defined in the front roller's end caps 36. The outer scraper sections 70 will not be required to shift to accommodate washer and spacer wear since the position of the grooves 74 in the end caps 36 does not change over time.

The remaining scraper sections 76 have either three or four protruding portions 56, and therefore different widths. The number and arrangement of the scraper sections 52 can be varied to accommodate a variety of different lengths of grooved rollers. Therefore, a different combination and arrangement of scraper sections 52 can be utilized for various grooved rollers having different lengths. The commonality of parts between the roller scrapers of different length rollers generally decreases manufacturing costs.

The springs 60 act to bias the scraper sections 52 towards the roller 18. The scraper sections 52 include edge portions which are biased into contact with the outer edges 80 of the washers 28 for aggressively clearing debris from that portion of the washers 28. The protruding portions 56 extend into the space 58 between adjacent washers 28 and terminate proximate the spacers 30 for clearing debris from the outer diameter of the spacers 30.

As seen in FIGS. 1 and 3, the rear roller scraper 26 includes an elongate plate member 46 having openings formed thereing which receive bolts for mounting the wear plate 27 to the elongate plate member 46. The elongate plate member 46 is the same part on the rear scraper 26 and the front grooved roller scraper 40, and therefore the part count of the cutting unit is reduced. The presence of openings in the elongate plate member 46 allows the rear roller scraper 26 to be provided with a wear plate 27 which allows the wear plate 27 to be replaced if damaged. It is therefore generally unnecessary to replace the elongate plate member 46. The wear plate 27 is easily removable for replacement if damaged, or it can simply be rotated to position the opposite, undamaged edge of the wear plate 27 in abutment with the smooth rear roller 20.

I claim:

1. A scraper mechanism for clearing debris from a ground engaging roller coupled with a reel mower cutting unit, wherein the roller includes washers and spacers stacked onto a central rod means such that spaces are defined between adjacent washers, said scraper mechanism comprising:

a laterally extending member operatively coupled with the cutting unit, a plurality of scraper section members fixed with the laterally extending member, said scraper section members further including protruding portions which extend into the spaces between adjacent washers of the roller for clearing debris from said spaces, said scraper section members being selectively shiftable laterally for being fixed at a plurality of different locations with respect to the laterally extending member, and the selective shifting of the scraper sections accommodates shifting of the washers for maintaining the protruding portions in desired position relative to the washers for scraping debris from side surfaces of the washers.

2. The invention of claim 1, wherein the scraper section members further comprise:

edge portions abuttable with radially outer edges of the washers for clearing debris from said outer edge.

3. The invention of claim 1, and further comprising biasing means for operatively biasing said scraper sections toward the roller.

4. The invention of claim 1, and further comprising:

slot means formed in said scraper sections, and attaching means positioned within said slot means for coupling the scraper sections to the laterally extending member.

5. The invention of claim 4, wherein the slot means allow the scraper sections to shift laterally with respect to the laterally extending member when said attaching means are loosened.

6. The invention of claim 1, wherein said washers and spacers tend to wear and become thinner after long periods of operation, and a spring member presses the washers and spacers together such that the washers and spacers shift as wear and thinning occurs, said scraper section members being laterally shiftable for proper alignment with the washers and spacers which have shifted due to wear.

7. The invention of claim 1, wherein at least three scraper members are provided.

8. The invention of claim 1, wherein at least five scraper members are provided.

9. A scraper mechanism for clearing debris from a ground engaging roller coupled with a reel mower cutting unit, wherein the roller includes washers and spacers stacked onto a central rod means such that spaces are defined between adjacent washers, said scraper mechanism comprising:

a laterally extending member coupled with the cutting unit, a plurality of scraper section members fixed with the laterally extending member, said scraper section members further comprising:

protruding portions which extend into the spaces between adjacent washers of the roller for clearing debris from said space, edge portions abuttable with radially outer edges of the washers for clearing debris from said outer edge, and slot means formed in said scraper sections, attaching means positioned within said slot means for coupling the scraper sections to the laterally extending member, said attaching means and slots allowing the scraper sections to be selectively shiftable laterally with respect to the laterally extending member so that the scraper sections can be fixed to the laterally extending member at a plurality of different locations, and biasing means for operatively biasing said scraper section members toward the roller.

10. The invention of claim 9 wherein said washers and spacers tend to wear and become thinner after long periods of operation, and a spring member presses the washers and spacers together such that the washers and spacers shift as wear and thinning occurs, said scraper section members being laterally shiftable for proper alignment with the washers and spacers which have shifted due to wear.

11. The invention of claim 10, wherein at least three scraper members are provided.

12. The invention of claim 10, wherein at least five scraper members are provided.

13. A scraper mechanism for clearing debris from a ground engaging roller coupled with a reel mower cutting unit, wherein the roller includes washers and spacers stacked onto a central rod means such that spaces are defined between adjacent washers, said scraper mechanism comprising:

a laterally extending member operatively coupled with the cutting unit, a plurality of scraper section members fixed with the laterally extending member, said scraper section members further including protruding portions which extend into the spaces between adjacent washers of the roller for clearing debris from said spaces, said scraper section members being selectively shiftable laterally for being fixed at a plurality of different locations with respect to the laterally extending member, said scraper section members further comprises edge portions abuttable with radially outer edges of the washers for clearing debris from said outer edge.

14. A scraper mechanism for clearing debris from a ground engaging roller coupled with a reel mower cutting unit, wherein the roller includes washers and spacers stacked onto a central rod means such that spaces are defined between adjacent washers, said scraper mechanism comprising:

a laterally extending member operatively coupled with the cutting unit, a plurality of scraper section members fixed with the laterally extending member, said scraper section members further including protruding portions which extend into the spaces between adjacent washers of the roller for clearing debris from said spaces, said scraper section members being selectively shiftable laterally for being fixed at a plurality of different locations with respect to the laterally extending member, and biasing means for operatively biasing said scraper sections toward the roller.

15. A scraper mechanism for clearing debris from a ground engaging roller coupled with a reel mower cutting unit, wherein the roller includes washers and spacers stacked onto a central rod means such that spaces are defined between adjacent washers, said scraper mechanism comprising:

a laterally extending member operatively coupled with the cutting unit, a plurality of scraper section members fixed with the laterally extending member, said scraper section members further including protruding portions which extend into the spaces between adjacent washers of the roller for clearing debris from said spaces, said scraper section members being selectively shiftable laterally for being fixed at a plurality of different locations with respect to the laterally extending member, and said washers and spacers tend to wear and become thinner after long periods of operation, and a spring member presses the washers and spacers together such that the washers and spacers shift as wear and thinning occurs, said scraper section members being laterally shiftable for proper alignment with the washers and spacers which have shifted due to wear.

\* \* \* \* \*